(12) United States Patent
Gill

(10) Patent No.: US 6,580,589 B1
(45) Date of Patent: Jun. 17, 2003

(54) PINNED LAYER STRUCTURE FOR A SPIN VALVE SENSOR HAVING COBALT IRON (COFE) AND COBALT IRON OXIDE (COFEO) LAMINATED LAYERS

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 09/684,710

(22) Filed: Oct. 6, 2000

(51) Int. Cl.[7] ............................................... G11B 5/39
(52) U.S. Cl. ........................................... 360/324.11
(58) Field of Search ............................. 360/324, 324.1, 360/324.11, 324.12, 324.2

(56) References Cited

U.S. PATENT DOCUMENTS

| | | |
|---|---|---|
| 4,103,315 A | 7/1978 | Hempstead et al. |
| 5,341,261 A | 8/1994 | Dieny et al. |
| 5,648,885 A | 7/1997 | Nishioka et al. |
| 5,701,223 A | 12/1997 | Fontana, Jr. et al. |
| 5,849,422 A | 12/1998 | Hayashi |
| 6,452,763 B1 * | 9/2002 | Gill ........................ 360/324.11 |

FOREIGN PATENT DOCUMENTS

| | | |
|---|---|---|
| JP | 402082601 A | 3/1990 |
| JP | 409063844 A | 3/1997 |
| JP | 10294217 | 11/1998 |

* cited by examiner

Primary Examiner—David L. Ometz
(74) Attorney, Agent, or Firm—Ervin F. Johnston

(57) ABSTRACT

A pinned layer structure of a spin valve sensor includes a laminate of alternating layers of cobalt iron (CoFe) and cobalt iron oxide (CoFeO). A range of thicknesses of each cobalt iron oxide (CoFeO) layer is from 5–20 Å. A first one of the cobalt iron (CoFe) layers interfaces a pinning layer in the spin valve sensor and a second one of the cobalt iron (CoFe) layers interfaces a spacer layer in the spin valve sensor.

25 Claims, 6 Drawing Sheets

(ABS)

PINNED LAYER STRUCTURE FOR A SPIN VALVE SENSOR HAVING COBALT IRON (COFE) AND COBALT IRON OXIDE (COFEO) LAMINATED LAYERS

BACKGROUND OF THE INVENTION

1. Field of the Invention

The present invention relates to a pinned layer structure for a spin valve sensor having cobalt iron (CoFe) and cobalt iron oxide (CoFeO) laminated layers and, more particularly, to such a pinned layer structure wherein the cobalt iron oxide (CoFeO) layers cause specular reflection of conduction electrons and each cobalt iron oxide (CoFeO) layer has a thickness within a range which permits the cobalt iron (CoFe) layers to be exchange coupled with respect to one another.

2. Description of the Related Art

A spin valve sensor is employed by a read head for sensing magnetic fields on a moving magnetic medium, such as a rotating magnetic disk. A typical sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) which is an exposed surface of the sensor that faces the magnetic medium. First and second leads are connected to the spin valve sensor for conducting a sense current therethrough. A magnetic moment of the free layer is free to rotate in positive and negative directions from a quiescent or bias point position in response to positive and negative magnetic field signals from a rotating magnetic disk. The quiescent position, which is preferably parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with respect to the pinned and free layers. When the magnetic moments of the pinned and free layers are parallel with respect to one another scattering is at a minimum and when their magnetic moments are antiparallel scattering is maximized. Changes in scattering in response to signal fields from a rotating disk changes the resistance of the spin valve sensor as a function of cos θ, where θ is the angle between the magnetic moments of the pinned and free layers. The sensitivity of the sensor is quantified as magnetoresistive coefficient dr/R where dr is the change in resistance of the sensor between parallel and antiparallel orientations of the pinned and free layers and R is the resistance of the sensor when the moments are parallel. A sense current $I_S$ is conducted through the spin valve sensor by processing circuitry so that when signal fields from a magnetic medium, such as a rotating magnetic disk, cause the magnetic moment of the free layer to move up and down from its parallel position with respect to the ABS, resistance changes of the spin valve sensor are processed as playback signals by the processing circuitry.

In some spin valve sensors an antiparallel (AP) pinned layer structure is substituted for a single layer pinned layer structure. The AP pinned layer structure includes a nonmagnetic AP coupling layer between first and second AP pinned layers. The first AP pinned layer is exchange coupled to the antiferromagnetic pinning layer which pins the magnetic moment of the first AP pinned layer in the same direction as the magnetic spins of the pinning layer. By exchange coupling between the first and second AP pinned layers the magnetic moment of the second AP pinned layer is pinned antiparallel to the magnetic moment of the first AP pinned layer. An advantage of the AP pinned layer structure is that demagnetization fields of the first and second AP pinned layers partially counterbalance one another so that a small demagnetization field is exerted on the free layer for improved biasing of the free layer. Further, the first AP pinned layer can be thinner than the single pinned layer which increases an exchange coupling field between the pinning layer and the first AP pinned layer. The AP pinned layer structure is described in U. S. Pat. No. 5,465,185 which is incorporated by reference herein. In addition to a spin valve sensor being either an AP pinned layer structure or a single layer pinned layer structure type of spin valve sensor, it may either be a top or bottom spin valve sensor. In a top spin valve sensor the free layer structure is located closer to the second read gap layer whereas in a bottom spin valve sensor the free layer structure is located closer to the first read gap layer.

The aforementioned magnetoresistive coefficient dr/R of the spin valve sensor is dependent upon the amount of conduction electrons scattered at the interfaces of the spacer layer with each of the pinned layer structure and the free layer structure. Unfortunately, some of the conduction electrons are lost from the mean free path through the pinned layer structure and the free layer structure which reduces the number of conduction electrons in the mean free path and reduces the magnetoresistive coefficient dr/R. There is a strong-felt need to prevent the loss of conduction electrons in the mean free path so as to maximize the magnetoresistive coefficient dr/R.

SUMMARY OF THE INVENTION

The present invention provides a pinned layer structure which enhances the mean free path of conduction electrons by specular reflection. Loss of conduction electrons through the pinned layer structure is prevented by making the pinned layer structure a laminate of alternating layers of cobalt iron (CoFe) and cobalt iron oxide (CoFeO). The cobalt iron oxide (CoFeO) layers reflect the conduction electrons back into the mean free path and each cobalt iron oxide (CoFeO) layer is sufficiently thin so as to permit the cobalt iron (CoFe) layers to be exchange coupled with respect to one another. I have discovered this thickness to be within a range from 5–20 Å. The pinned layer structure has a plurality of cobalt iron (CoFe) layers and a plurality of cobalt iron oxide (CoFeO) layers with one of the cobalt iron (CoFe) layers interfacing the pinning layer and another one of the cobalt iron (CoFe) layers interfacing the spacer layer. Specular reflection is fully described in an article entitled "Oxygen as a Surfactant in the Growth of Giant Magnetoresistance Spin Valves" found on pages 6142–6151 of *J. Appl. Phys.* 82 (12). Dec. 15, 1997.

An object of the present invention is to provide a pinned layer structure for a spin valve sensor which will reflect conduction electrons back into a mean free path so as to prevent a loss in a magnetoresisuive coefficient dr/R of the spin valve sensor.

Another object is to accomplish the foregoing object without a loss of magnetic moment of the ferromagnetic layers within the pinned layer structure.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
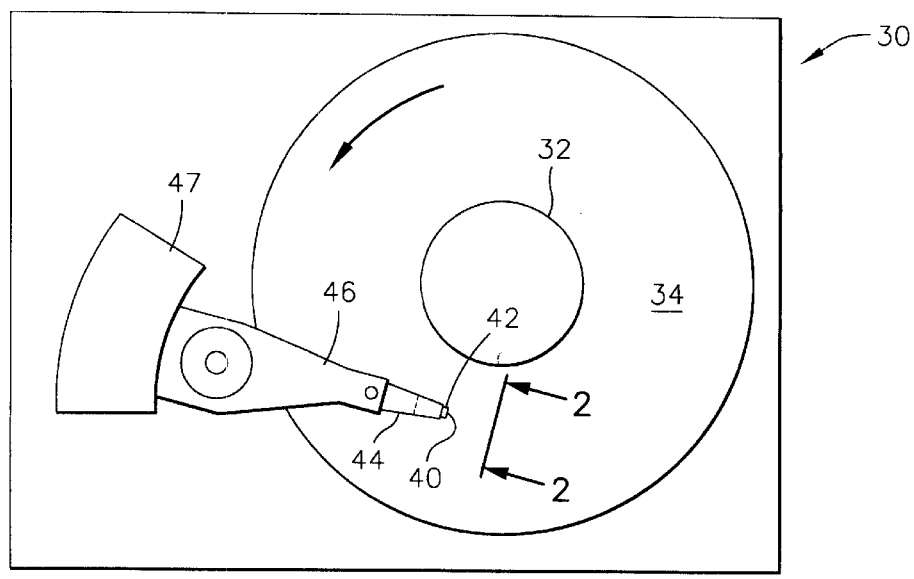
FIG. 1 is a plan view of an exemplary magnetic disk drive.
Figure 2:
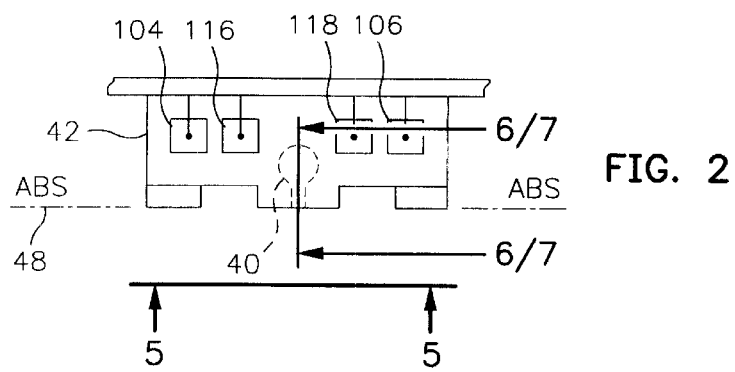
FIG. 2 is an end view of a slider with a magnetic head of the disk drive as seen in plane 2—2.
Figure 3:
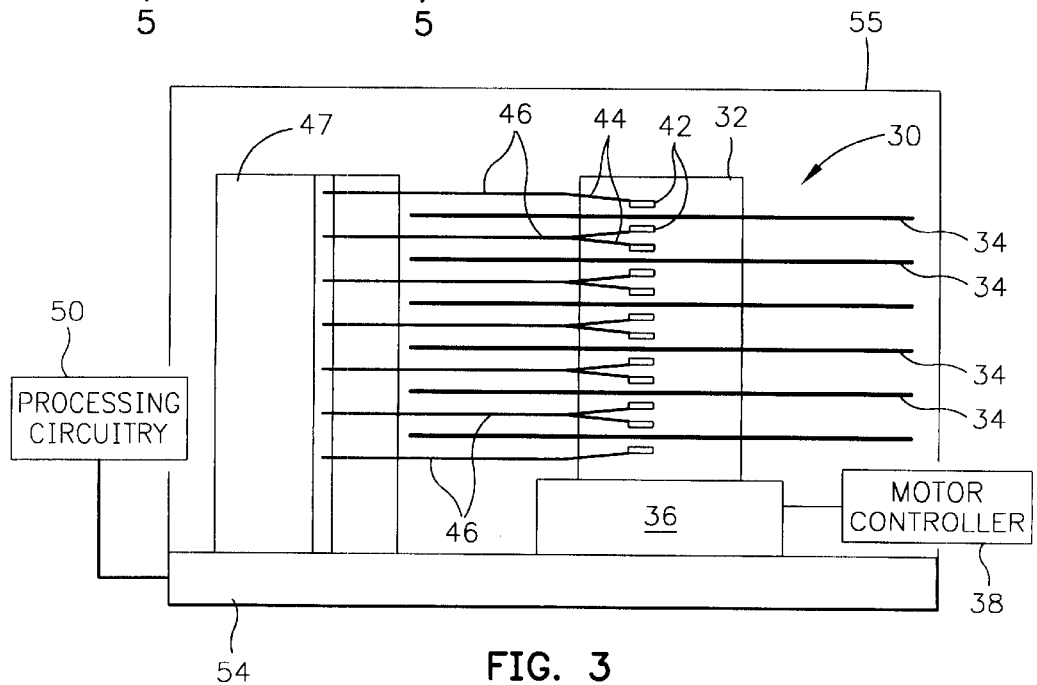
FIG. 3 is an elevation view of the magnetic disk drive wherein multiple disks and magnetic heads are employed.
Figure 4:
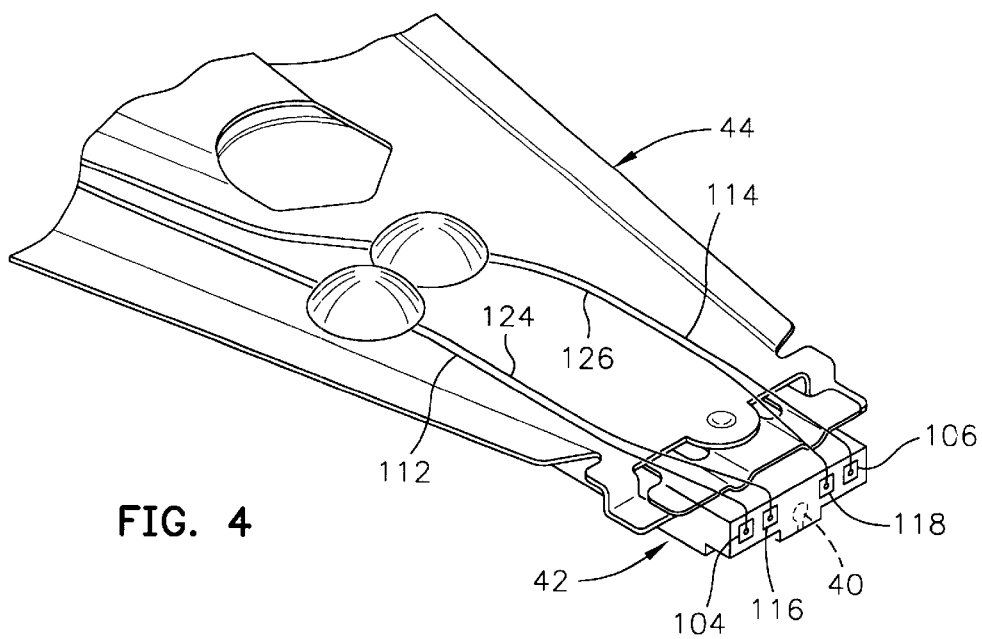
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 which is rotatably positioned by an actuator 47. A plurality of disks, sliders and suspensions may be employed in a large capacity direct access storage device (DASD) as shown in FIG. 3. The actuator 47 moves the actuator arm 46 and the suspension 44 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
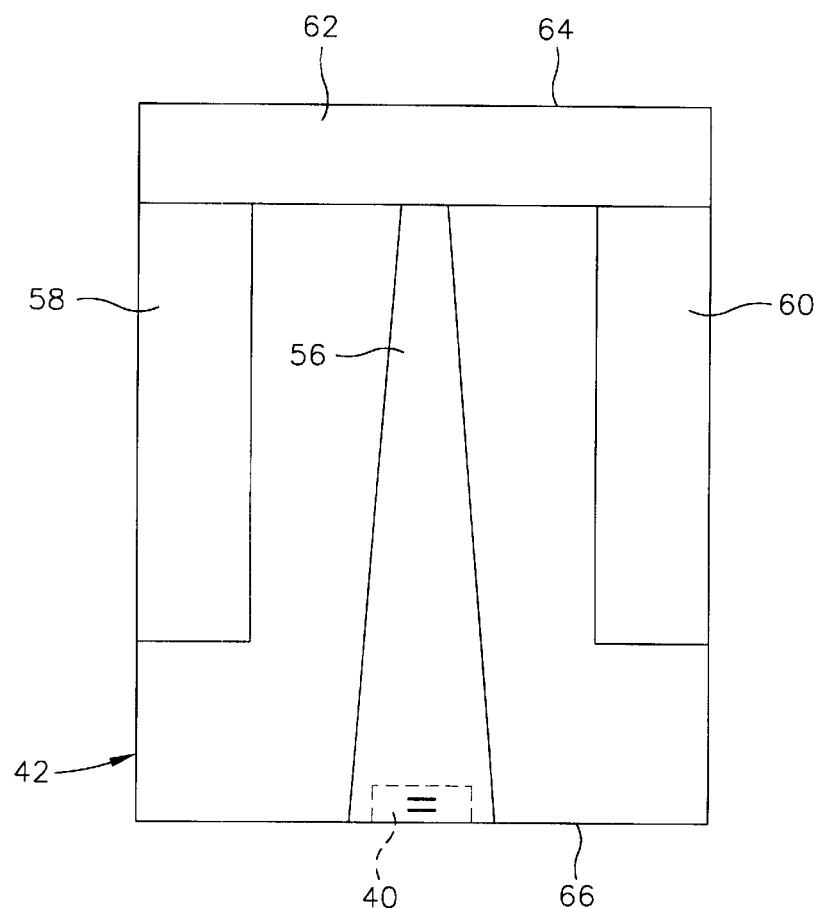
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
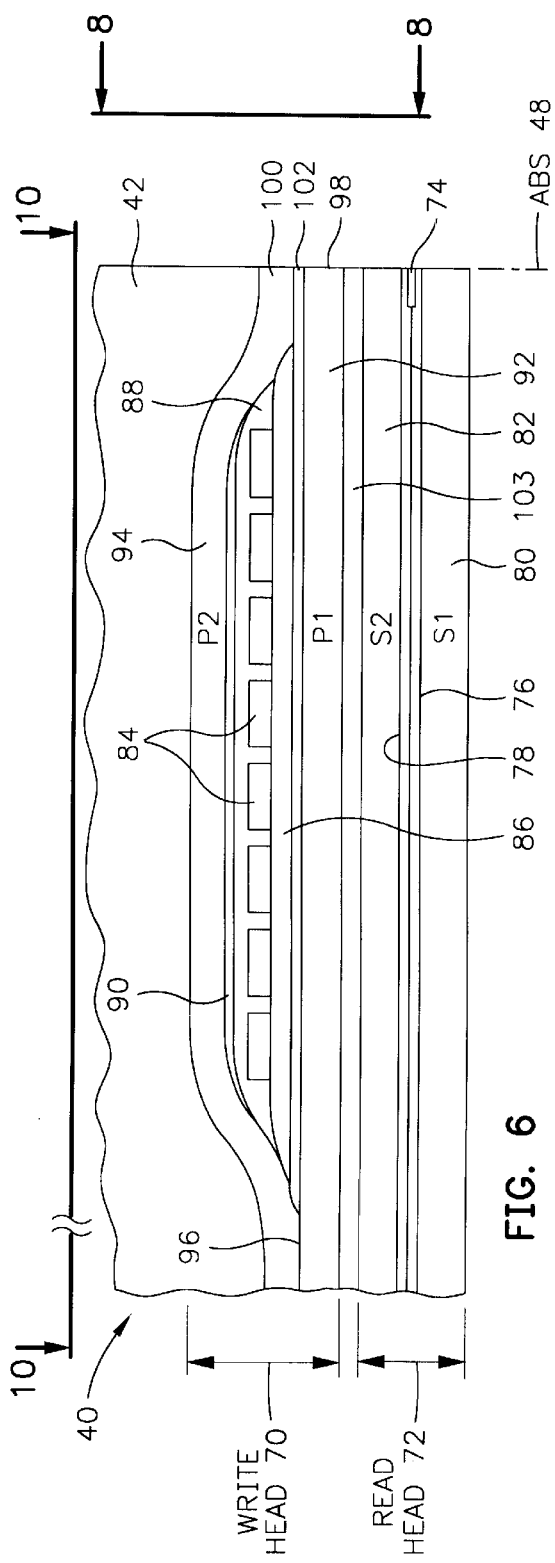
FIG. 6 is a partial view of the slider and a piggyback magnetic head as seen in plane 6—6 of FIG. 2.
Figure 8:
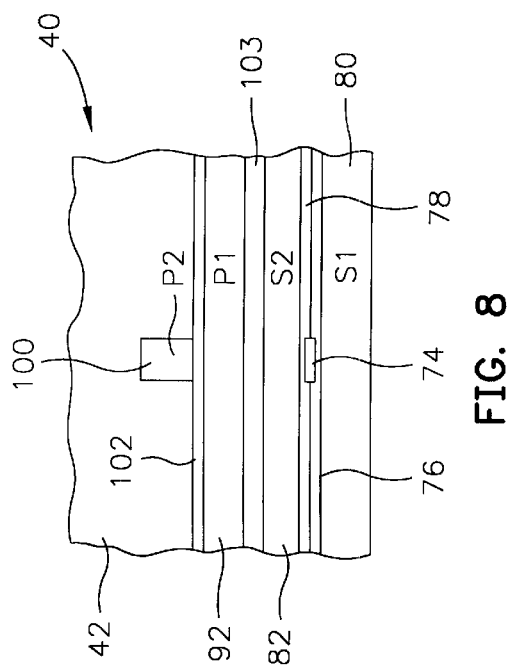
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

Figure 10:
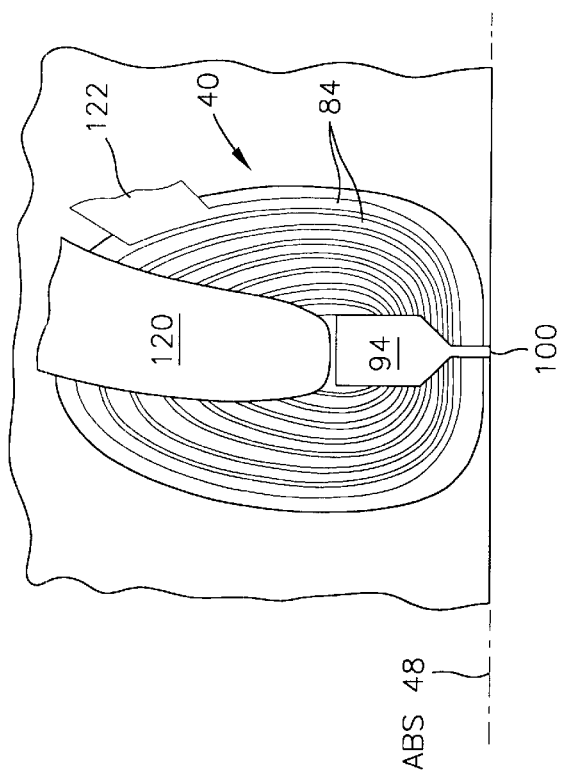
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
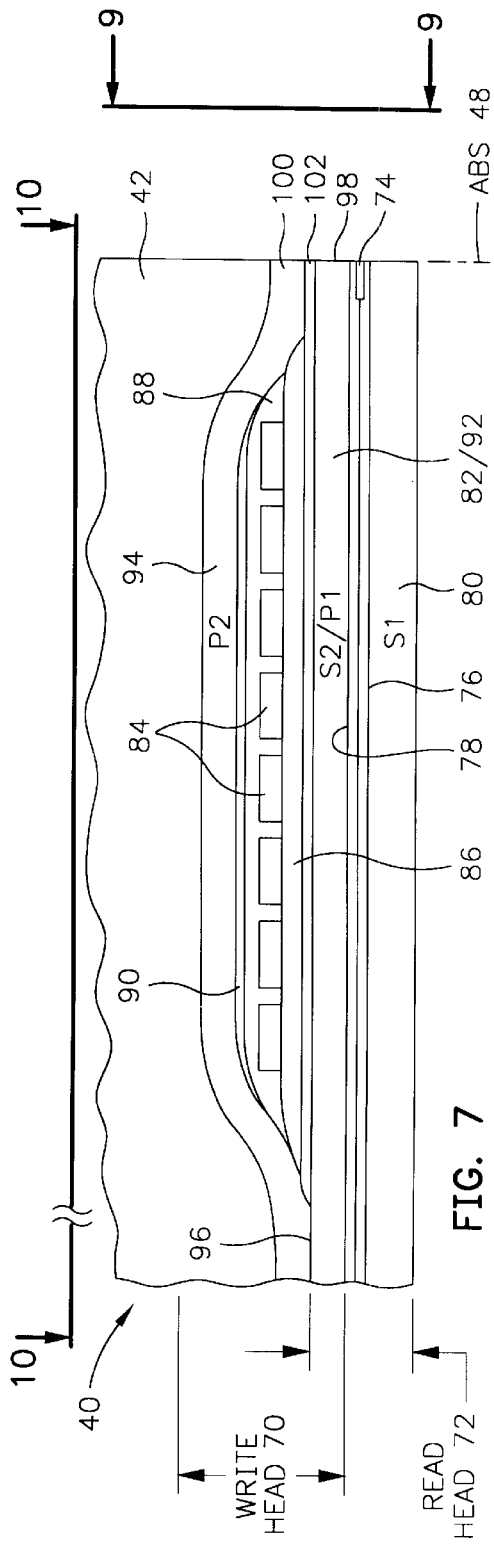
FIG. 7 is a partial view of the slider and a merged magnetic head as seen in plane 7—7 of FIG. 2.
Figure 9:
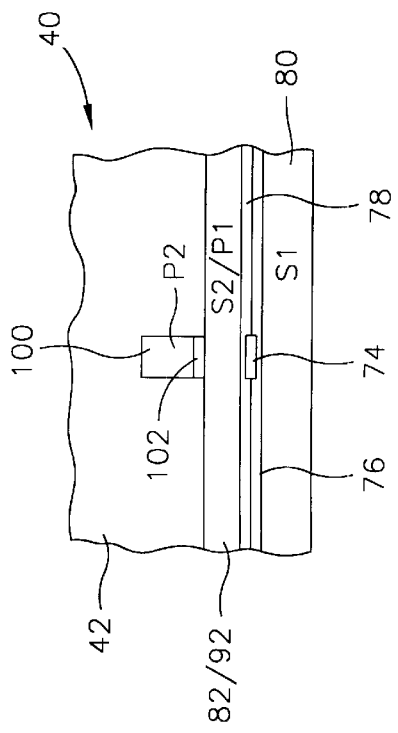
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
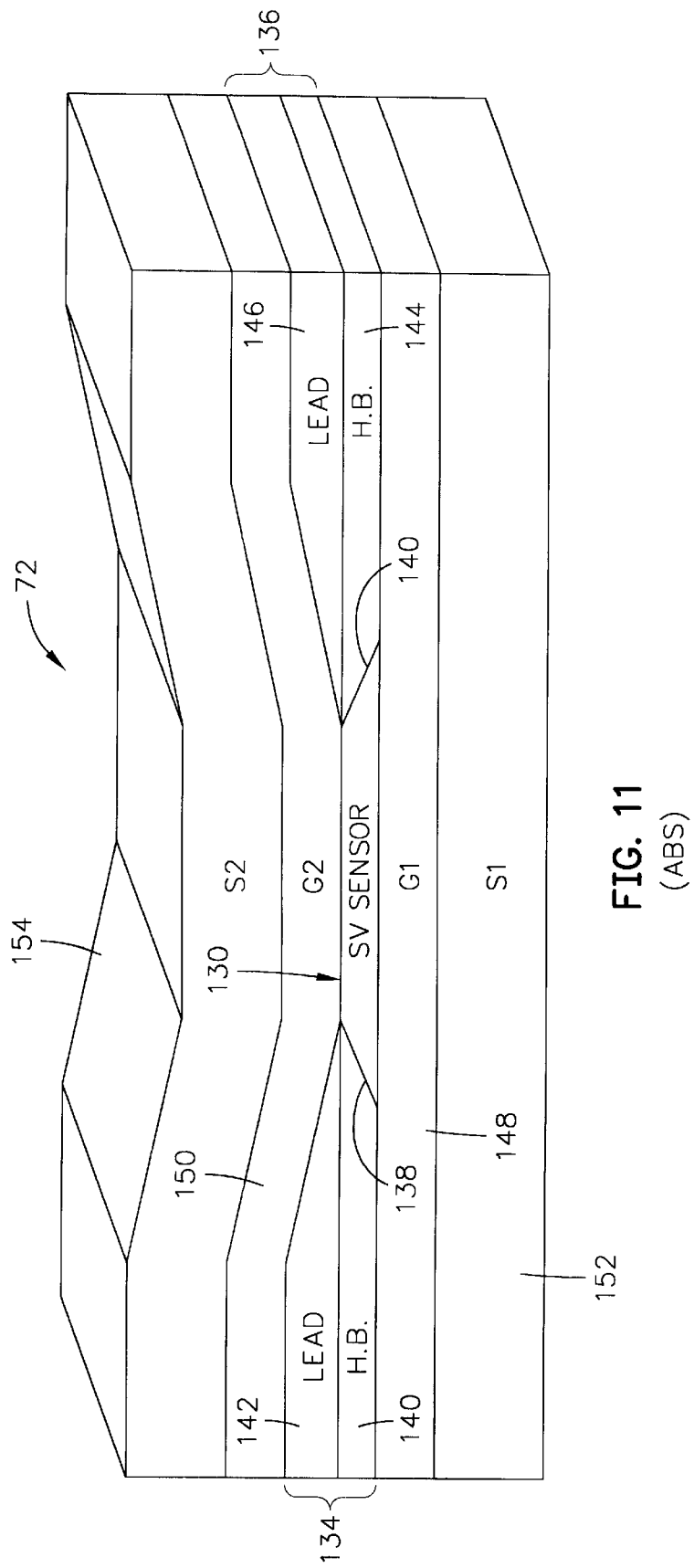
FIG. 11 is an isometric ABS illustration of a read head which incorporates the present spin valve sensor.

FIG. 11 is an isometric ABS illustration of a prior art read head 72 which has a spin valve sensor 130. The spin valve sensor 130 has a pinned layer structure, to be described hereinafter, which has a magnetic moment that is pinned by an antiferromagnetic (AFM) pinning layer which will be described hereinafter. First and second hard bias and lead layers 134 and 136 are connected to first and second side edges 138 and 140 of the spin valve sensor. This connection is known in the art as a contiguous junction and is fully described in commonly assigned U. S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
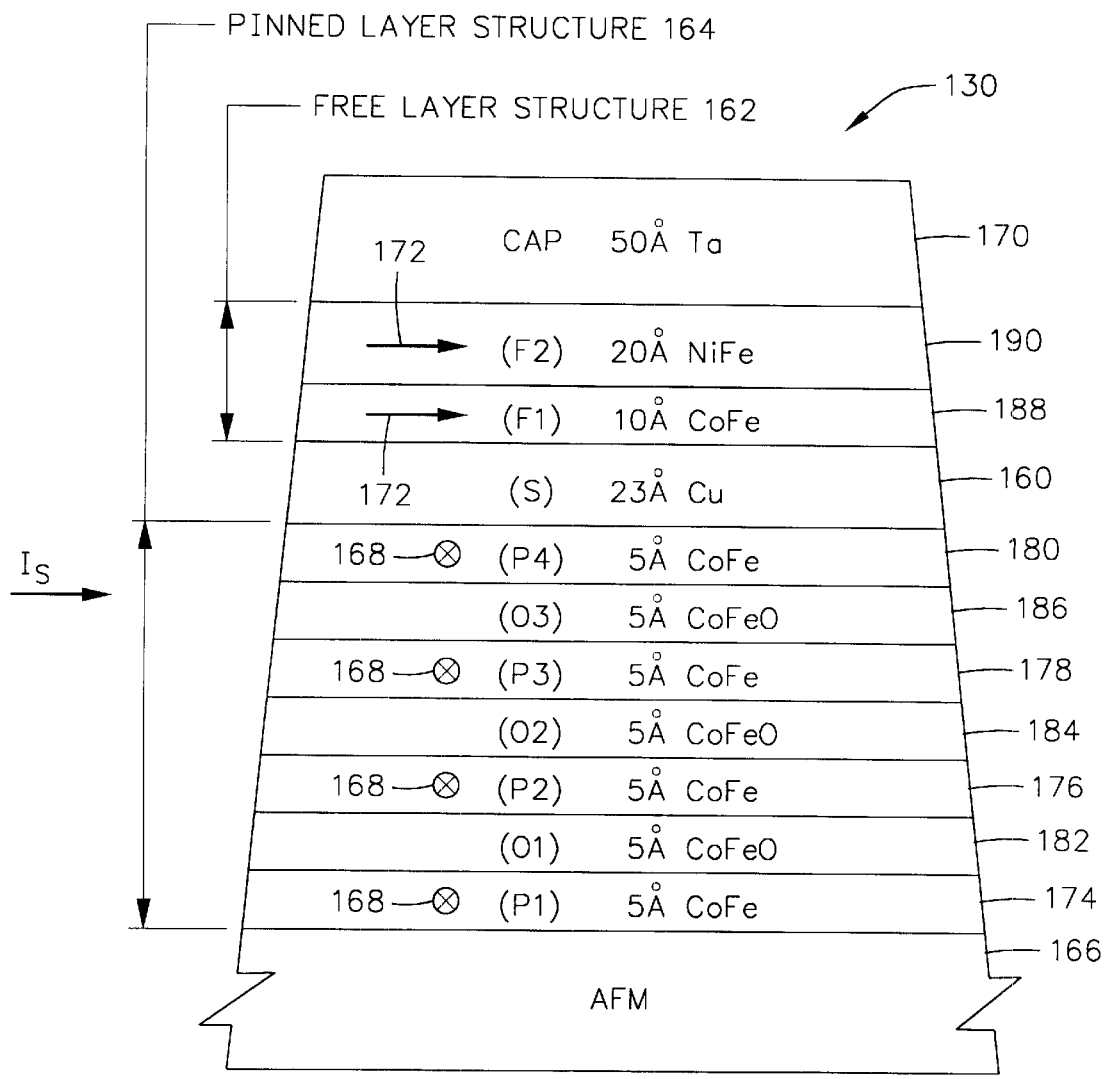
FIG. 12 is an ABS illustration of the present spin valve sensor.

FIG. 12 is an ABS illustration of the present spin valve sensor 130. The spin valve sensor 130 includes a nonmagnetic electrically conductive spacer layer (S) 160 which is located between a free layer structure 162 and a pinned layer structure 164. The pinned layer structure 164 interfaces and is exchange coupled to an antiferromagnetic (AFM) pinned layer 166 which pins a magnetic moment 168 of the pinned layer structure in a direction perpendicular to the ABS, such as into the spin valve sensor as shown in FIG. 12. A cap layer 170 is located on the free layer structure 162 for protecting it from subsequent processing steps. The free layer structure 162 has a magnetic moment 172 which is oriented parallel to the ABS and may be directed to the right, as illustrated in FIG. 12. When a signal field from the rotating magnetic disk 34 in FIG. 1 rotates the magnetic moment 172 into the sensor, the magnetic moments 168 and 172 become more parallel which decreases the resistance of the sensor and when the signal field rotates the magnetic moment 172 in a direction out of the sensor, the magnetic moments 168 and 172 become more antiparallel which increases the resistance of the spin valve sensor. These changes in resistance, which represent positive and negative applied field signals, are processed as playback signals by the processing circuitry 50 in FIG. 3.

The pinned layer structure 164 is a laminate of a plurality of alternating ferromagnetic layers (P1, P2, P3 and P4) 174, 176, 178 and 180 and a plurality of oxide layers (O1, O2 and O3) 182, 184 and 186. The ferromagnetic layers are cobalt iron (CoFe) and the oxide layers are cobalt iron oxide (CoFeO). It has been found that when the oxide layers are an oxide of the ferromagnetic layers that the specular reflection and the magnetoresistive coefficient dr/R are increased. This arrangement enhances and simplifies the making of the pinned layer structure by sputtering a cobalt iron (CoFe) layer and then oxidizing a top portion of this layer by introducing oxygen within a sputtering chamber or sputtering the cobalt iron (CoFe) in the presence of oxygen. Further, it has been discovered that the oxide layers must be sufficiently thin so as to permit an exchange coupling between the ferromagnetic layers so that there is no loss of the magnetic moment of the pinned layer structure.

This value has been found to be about 20 Å. Further, it has been discovered that each oxide layer must be sufficiently thick so as to cause a desired specular reflection of conduction electrons back into the mean free path. This value has been found to be about 5 Å. Accordingly, the range of thickness of each cobalt iron oxide (CoFeO) layer should be in a range from 5–20 Å. Further, it has been found that the first cobalt iron (CoFe) layer 174 should interface the pinning layer 166 so as to establish the desired exchange coupling between the pinning layer 166 and the pinned layer structure 164 and the fourth cobalt iron (CoFe) layer 180 should interface the spacer layer 160 so as to maximize the magnetoresistive coefficient dr/R.

A preferred thickness of each of the cobalt iron (CoFe) layers 174, 176, 178 and 180 is 5 Å and a preferred thickness of each of the cobalt iron oxide (CoFeO) layers 182, 184 and 186 is also 5 Å. With these thicknesses the overall thickness of the pinned layer structure 164 is minimized so as to reduce the read gap, but yet is sufficiently thick so as to cause the pinned layer structure to have the required magnetic moment and reflect conduction electrons back into the mean free path of conduction electrons.

An exemplary thickness of the spacer layer 160 is 23 Å of copper (Cu). In the preferred embodiment the free layer structure 162 includes first and second free layers (F1 and F2) 188 and 190, wherein the first free layer 188 is 10 Å of cobalt iron (CoFe) and the second free layer 190 is 20Å of nickel iron (NiFe). It has been found that when the free layer structure 162 includes a cobalt iron (CoFe) layer 188 next to a copper (Cu) spacer layer 160 that the magnetoresistive coefficient dr/R is increased. An exemplary thickness for the cap layer is 50Å of tantalum (Ta). Exemplary thicknesses and materials for the pinning layer 166 are 425 Å of nickel oxide (NiO), 150Å of nickel manganese NiMn), 150 Å of platinum manganese (PtMn) and 80μ of iridium manganese (IrMn).

Discussion

While the above described spin valve sensor 130 is a bottom spin valve sensor, it should be understood that the present invention may be employed in a top spin valve sensor as described in the Summary of the Invention. Further, the present invention may also be employed for one or both of the AP pinned layers of an AP pinned layer structure which is also described in the Summary of the Invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
    a ferromagnetic pinned layer structure that has a magnetic moment;
    an antiferromagnetic pinning layer exchange coupled to the pinned layer for pinning the magnetic moment of the pinned layer;
    a ferromagnetic free layer structure that has a magnetic moment;
    a nonmagnetic conductive spacer layer located between the free layer structure and the pinned layer structure; and
    the pinned layer structure including cobalt iron (CoFe) and cobalt iron oxide (CoFeO) laminated layers.

2. A magnetic read head as claimed in claim 1 including:
    nonmagnetic nonconductive first and second read gap layers;
    the spin valve sensor being located between the first and second read gap layers;
    ferromagnetic first and second shield layers; and
    the first and second read gap layers being located between the first and second shield layers.

3. A magnetic read head as claimed in claim 2 wherein the pinned layer structure includes a plurality of cobalt iron (CoFe) layers and a plurality of cobalt iron oxide (CoFeO) layers with a first cobalt iron (CoFe) layer interfacing the pinning layer and a second cobalt iron (CoFe) layer interfacing the spacer layer.

4. A magnetic read head as claimed in claim 3 wherein each cobalt iron oxide (CoFeO) layer has a thickness within a range of 5–20 Å.

5. A magnetic read head as claimed in claim 4 wherein each cobalt iron (CoFe) layer has a thickness of 5 Å.

6. A magnetic head assembly comprising:
    a write head including:
        ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

a read head including:

a spin valve sensor;

nonmagnetic nonconductive first and second read gap layers;

the spin valve sensor being located between the first and second read gap layers;

a ferromagnetic first shield layer; and the first and second read gap layers being located between the first shield layer and the first pole piece layer;

the spin valve sensor including:

a ferromagnetic pinned layer structure that has a magnetic moment;

an antiferromagnetic pinning layer exchange coupled to the pinned layer for pinning the magnetic moment of the pinned layer;

a ferromagnetic free layer structure that has a magnetic moment;

a nonmagnetic conductive spacer layer located between the free layer structure and the pinned layer structure; and the pinned layer structure including cobalt iron (CoFe) and cobalt iron oxide (CoFeO) laminated layers.

7. A magnetic head assembly as claimed in claim 6 including:

a ferromagnetic second shield layer;

a nonmagnetic isolation layer; and the second shield layer being located between the second gap layer and the isolation layer and the nonmagnetic isolation layer being located between the second shield layer and the first pole piece layer.

8. A magnetic head assembly as claimed in claim 6 wherein the pinned layer structure includes a plurality of cobalt iron (CoFe) layers and a plurality of cobalt iron oxide (CoFeO) layers with a first cobalt iron (CoFe) layer interfacing the pinning layer and a second cobalt iron (CoFe) layer interfacing the spacer layer.

9. A magnetic head assembly as claimed in claim 8 wherein each cobalt iron oxide (CoFeO) layer has a thickness within a range of 5–20 Å.

10. A magnetic head assembly as claimed in claim 9 wherein each cobalt iron (CoFe) layer has a thickness of 5 Å.

11. A magnetic disk drive including at least one magnetic head assembly wherein the magnetic head assembly has an air bearing surface (ABS) and includes a write head and a read head, comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

the read head including:

a spin valve sensor;

nonmagnetic nonconductive first and second read gap layers;

the spin valve sensor being located between the first and second read gap layers;

a ferromagnetic first shield layer; and the first and second read gap layers being located between the first shield layer and the first pole piece layer;

the spin valve sensor including:

a ferromagnetic pinned layer structure that has a magnetic moment;

an antiferromagnetic pinning layer exchange coupled to the pinned layer for pinning the magnetic moment of the pinned layer;

a ferromagnetic free layer structure that has a magnetic moment;

a nonmagnetic conductive spacer layer located between the free layer structure and the pinned layer structure; and the pinned layer structure including cobalt iron (CoFe) and cobalt iron oxide (CoFeO) laminated layers;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

12. A magnetic disk drive as claimed in claim 11 including:

a ferromagnetic second shield layer;

a nonmagnetic isolation layer; and the second shield layer being located between the second gap layer and the isolation layer and the nonmagnetic isolation layer being located between the second shield layer and the first pole piece layer.

13. A magnetic disk drive as claimed in claim 11 wherein the pinned layer structure includes a plurality of cobalt iron (CoFe) layers and a plurality of cobalt iron oxide (CoFeO) layers with a first cobalt iron (CoFe) layer interfacing the pinning layer and a second cobalt iron (CoFe) layer interfacing the spacer layer.

14. A magnetic disk drive as claimed in claim 13 wherein each cobalt iron oxide (CoFeO) layer has a thickness within a range of 5–20 Å.

15. A magnetic disk drive as claimed in claim 14 wherein each cobalt iron (CoFe) layer has a thickness of 5 Å.

16. A method of making a read head comprising the steps of:

forming a ferromagnetic pinned layer structure that has a magnetic moment;

forming an antiferromagnetic pinning layer exchange coupled to the pinned layer for pinning the magnetic moment of the pinned layer.

forming a ferromagnetic free layer structure that has a magnetic moment;

forming a nonmagnetic conductive spacer layer between the free layer structure and the pinned layer structure; and forming the pinned layer structure of cobalt iron (CoFe) and cobalt iron oxide (CoFeO) laminated layers.

17. A method of making a read head as claimed in claim 16 including:

forming nonmagnetic nonconductive first and second read gap layers;

forming the spin valve sensor between the first and second read gap layers;

forming ferromagnetic first and second shield layers; and forming the first and second read gap layers between the first and second shield layers.

18. A method of making a read head as claimed in claim 17 wherein the pinned layer structure is formed of a plurality of cobalt iron (CoFe) layers and a plurality of cobalt iron oxide (CoFeO) layers with a first cobalt iron (CoFe) layer interfacing the pinning layer and a second cobalt iron (CoFe) layer interfacing the spacer layer.

19. A method of making a read head as claimed in claim 18 wherein each cobalt iron oxide (CoFeO) layer is formed with a thickness within a range of 5–20 Å.

20. A method of making a read head as claimed in claim 19 wherein each cobalt iron (CoFe) layer is formed with a thickness of 5 Å.

21. A method of making a magnetic head assembly comprising the steps of:

making a write head including the steps of:
  forming ferromagnetic first and second pole piece layers in pole tip, yoke and back gap regions wherein the yoke region is located between the pole tip and back gap regions;
  forming a nonmagnetic nonconductive write gap layer between the first and second pole piece layers in the pole tip region;
  forming an insulation stack with at least one coil layer embedded therein between the first and second pole piece layers in the yoke region; and
  connecting the first and second pole piece layers at said back gap region;

making a read head including the steps of:
  forming a spin valve sensor;
  forming nonmagnetic nonconductive first and second read gap layers;
  forming the spin valve sensor between the first and second read gap layers;
  forming a ferromagnetic first shield layer; and
  forming the first and second read gap layers between the first shield layer and the first pole piece layer; and a making of the spin valve sensor including the steps of:
  forming a ferromagnetic pinned layer structure that has a magnetic moment:
  forming an antiferromagnetic pinning layer exchange coupled to the pinned layer for pinning the magnetic moment of the pinned layer;
  forming a ferromagnetic free layer structure that has a magnetic moment;
  forming a nonmagnetic conductive spacer layer between the free layer structure and the pinned layer structure; and
  the pinned layer structure being composed of cobalt iron (CoFe) and cobalt iron oxide (CoFeO) laminated layers.

22. A method of making a magnetic head assembly as claimed in claim 21 further including the steps of:

forming a ferromagnetic second shield layer interfacing the second read gap layer; and forming a nonmagnetic isolation layer between the second shield layer and the first pole piece layer.

23. A method of making a magnetic head assembly as claimed in claim 21 wherein the pinned layer structure is formed of a plurality of cobalt iron (CoFe) layers and a plurality of cobalt iron oxide (CoFeO) layers with a first cobalt iron (CoFe) layer interfacing the pinning layer and a second cobalt iron (CoFe) layer interfacing the spacer layer.

24. A method of making a magnetic head assembly as claimed in claim 23 wherein each cobalt iron oxide (CoFeO) layer is formed with a thickness within a range of 5–20 Å.

25. A method of making a magnetic head assembly as claimed in claim 24 wherein each cobalt iron (CoFe) layer is formed with a thickness of 5 Å.

* * * * *